DATA MESSAGE HANDLING SYSTEM

Filed Sept. 15, 1967 2 Sheets-Sheet 1

INVENTOR.
ORVILLE DOUGLAS GREENWOOD

INVENTOR.
ORVILLE DOUGLAS GREENWOOD

United States Patent Office 3,482,035

Patented Dec. 2, 1969

3,482,035

DATA MESSAGE HANDLING SYSTEM

Orville Douglas Greenwood, San Diego, Calif., assignor to General Dynamics Corporation, a corporation of Delaware Filed Sept. 15, 1967, Ser. No. 667,920
Int. Cl. H04l *15/00;* H04q *1/00*
U.S. Cl. 178—3 8 Claims

ABSTRACT OF THE DISCLOSURE

Disclosed herein is an apparatus for use in a teletypewriter or telegraph printer communication system for reading incoming messages and permitting a telegraph printer to print only those messages having predetermined addresses. A stream of data bits, including call words indicating the addresses of the message, is continually received by the apparatus. A character assembler responds to the incoming bits and assembles each group of bits which make up a teletypewriter data character. The apparatus has storage for a plurality of bits representing the characters of the call words, together with other reference characters. The assembler provides a signal indicative of assembly of each character and then a word containing a plurality of successive assembled data bits is read into a comparator, together with the call words. When the comparator provides an output indicating that data word under comparison corresponds to a call word, the message is permitted to be applied to a telegraph printer and is printed out. The comparator continues to compare incoming data bits with reference characters and inhibits the flow of data bits to the printer when an end of message word is ultimately received.

The present invention relates to data message handling systems, and particularly to a system for controlling printout of teletypewriter and other data messages so that only the predetermined messages which are intended to be received are actually printed out.

In present methods of teletypewriter transmissions, a continuous stream of messages is transmitted. All receiving stations continuously print out the message regardless of whether the message was directed to that station. Station personnel must call the messages by reading the call words in the headings. It has been estimated that only five messages in 200 are addressed to any particular station. The result is waste of time and paper. Perhaps more important is that operator efficiency is diminished and unnecessary wear of the printers takes place. It is desirable to monitor incoming transmissions and to operate the printers to print out only those messages which contain the addresses intended for particular stations. Because the messages arrive asynchronously, it has been difficult to select messages by conventional address comparison techniques.

Accordingly, it is an object of the present invention to provide an improved apparatus for sorting incoming teletypewriter messages according to their addresses so that only wanted messages are printed out.

It is a further object of the invention to provide an improved teletypewriter station system which reduces duplication of unwanted messages, increases the efficiency of utilization of teletypewriter machines, and decreases paper costs and maintenance requirements.

It is a still further object of the present invention to provide improved teletypewriter station apparatus wherein the bits of incoming characters are assembled quickly and before the addresses of the messages are read so that a teletypewriter can print the characters of the wanted messages immediately and without garbling.

Briefly described, a teletypewriter message handling system embodying the invention includes registers which store sequences of teletypewriter characters which arrive at the start of each message. Memories are also provided for storing reference characters and the characters of call words which make up the addresses. The messages are printed out following the last of the received words when a comparator produces an output indicating correspondence of a stored received word with a stored call word. The storage of the data bits is under the control of a character assembler which assembles the incoming data bits into the characters according to the code which is used (5 digit BAUDOT code in the case of normal teletypewriter transmission). The assembler includes a decoder which responds to a group containing a certain number of successive bits which follow a prescribed initial bit. When the last of the group of bits arrives in proper time sequence, a character assembly flag signal is produced which transfers the character to storage and initiates the comparison of the stored word, including the character, with the call words.

The invention itself, both as to its organization and method of operation, as well as additional objects and advantages thereof will become more readily apparent from a reading of the following description in connection with the accompanying drawings in which.

Figure 1:
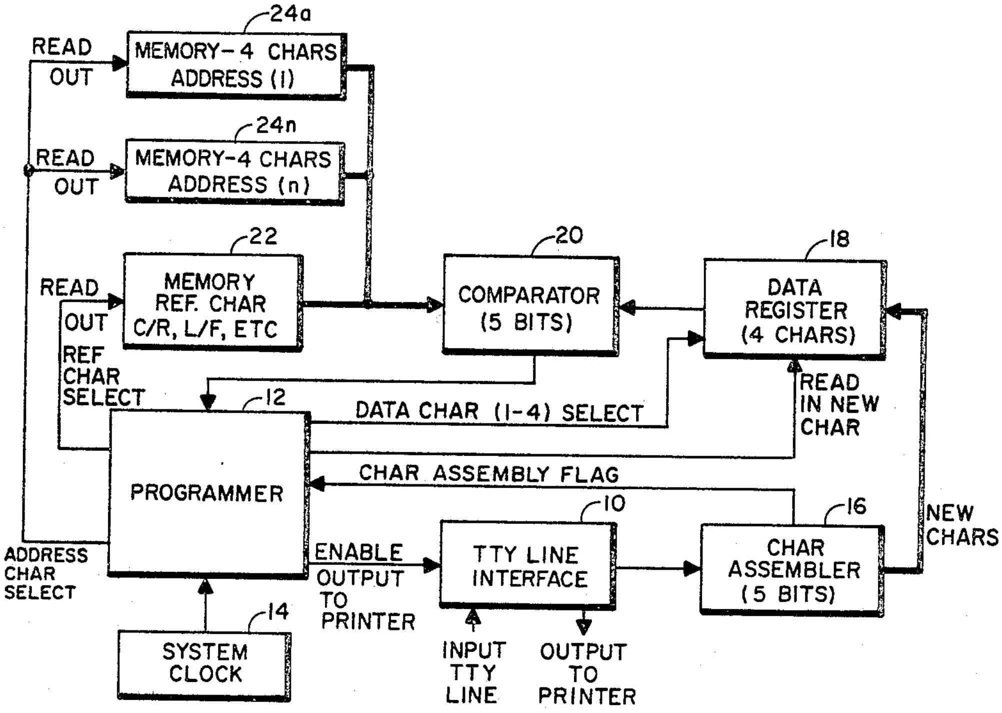
FIG. 1 is a block diagram of teletypewriter address reading apparatus embodying the invention.

Referring more particularly to FIG. 1, the input teletypewriter (TTY) line which carries transmissions of TTY messages to all stations is connected to a TTY line interface unit 10. This unit controls the connection of the input TTY line to an output to a printer line when an enabling signal is presented to the unit 10 from a programmer 12. The programmer runs through a sequence of operations under timing provided by a system clock 14 which produces clock pulses at a rate much faster than the TTY data bit rate, each time a character assembly flag signal is applied thereto from a character assembler unit 16.

The character assembler unit 16 also receives the bits from the input TTY line and assembles each character. The character is considered to have five bits in accordance with conventional teletypewriter practice. Each new character, upon assemblage, is presented to a data register 18, e.g., a shift register, which stores four successive characters. The receipt of a new character is signalled by the character assembly flag which is applied to the programmer. The programmer, upon receipt of the flag, conditions the register to read in the new character. Thereafter, the programmer issues a data character select command and presents the characters stored in the register one character at a time to the comparator 20. The comparator has the capacity for comparing one character of five bits from the data register with a five bit character which is stored in several memories; namely, a reference character memory 22, and address or call word memories 24*a* to 24*n*. The programmer provides reference character select commands and address character select commands to the memories 22 and 24*a* to 24*n* so as to read out the characters therein in proper sequence to the comparator. The comparator responds by instructing the programmer with respect to the results of the comparison. The data character select commands and reference and address character select commands are furnished in accordance with a hard wired program built into the programmer.

The entire program is initiated by the character assembly flag signal in the following sequence: a group of four characters in the data register 18 are compared one at a time with reference characters in the reference character memory 22. If a start sequence (start of message subroutine) is detected, the line interface unit 10 is enabled to connect the input line to the printer. A search is then conducted by comparing the four characters in the register sequentially with characters stored in each of the addresss memories 24*a* to 24*n*. If the stored data characters correspond to an address, the readout to the printer is continued until another start sequence is detected. In other words, comparison of the four characters in the data register with a sequence of reference characters stored in the reference character memory 22 is run through on occurrence of each character assembly flag even while printing is taking place. If a stop sequence (end of heading subroutine) is detected without a general address, the output to the printer is inhibited. Thus, each character is examined and the input TTY line is not connected to the printer, except during short intervals between a start sequence and a stop sequence, or when an address is detected and the desired message is received by the teletypewriter receiving station.

Figure 2:
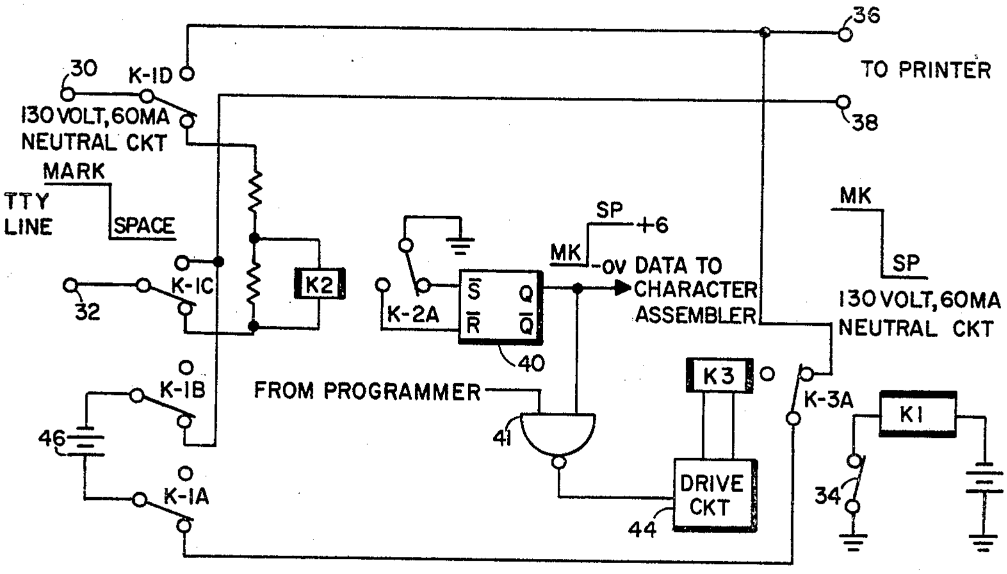
FIG. 2 is a schematic diagram, partially in block form, of the teletypewriter line interface unit used in the device of FIG. 1.

The TTY line interface unit 10 is shown in greater detail in FIG. 2. The mark (MK) and space (SP) bits are presented to input terminals 30 and 32 to which the TTY line is connected. A bypass switch 34 which is normally closed, operates a relay K1. The contacts of that relay K1*a*, K1*b*, K1*c* and K1*d* are illustrated as being pulled in (relay energized), which is their normal operating position with the switch 34 closed. If the switch 34 is opened or if a power failure occurs, the contacts of the relay K1 will drop out, thereby connecting the TTY line directly to the printer output terminals 36 and 38 so that no messages will be lost. With the bypass switch 34 closed, the incoming bits are applied to a repeater relay K2. K2 pulls in or drops out depending upon whether the data bits are Mark (60 ma. current) or Space (no current). When the relay pulls in, a flip-flop 40 will be reset, while when the relay drops out, the flip-flop will be set; set and reset signals being ground.

The state of the flip-flop as measured at its Q terminal will then represent the data bits. These data bits are applied to the character assembler directly and through a NAND gate 41 to a drive circuit 44, when the NAND gate 41 receives an enabling signal from the programmer 12 of FIG. 1. The drive circuit is a relay driver amplifier for a bistable relay K3. As the relay contacts K3*a* pull in, the output terminals 38 will be open circuited through K1*a* and K1*b*, thereby transferring a space pulse to the printer. A mark pulse will be transferred by the application of a voltage level from the source shown as a battery 46 via the contacts K1*b* and K1*a* when the relay K3*a* drops out.

Figure 3:
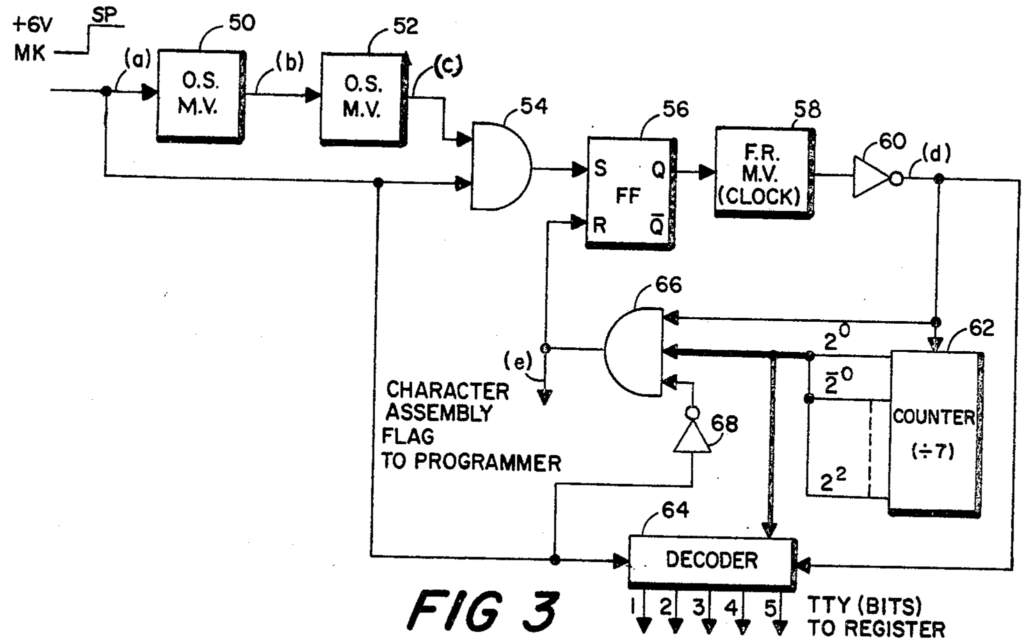
FIG. 3 is a block diagram of the character assembler which is used in the device of FIG. 1.
Figure 4:
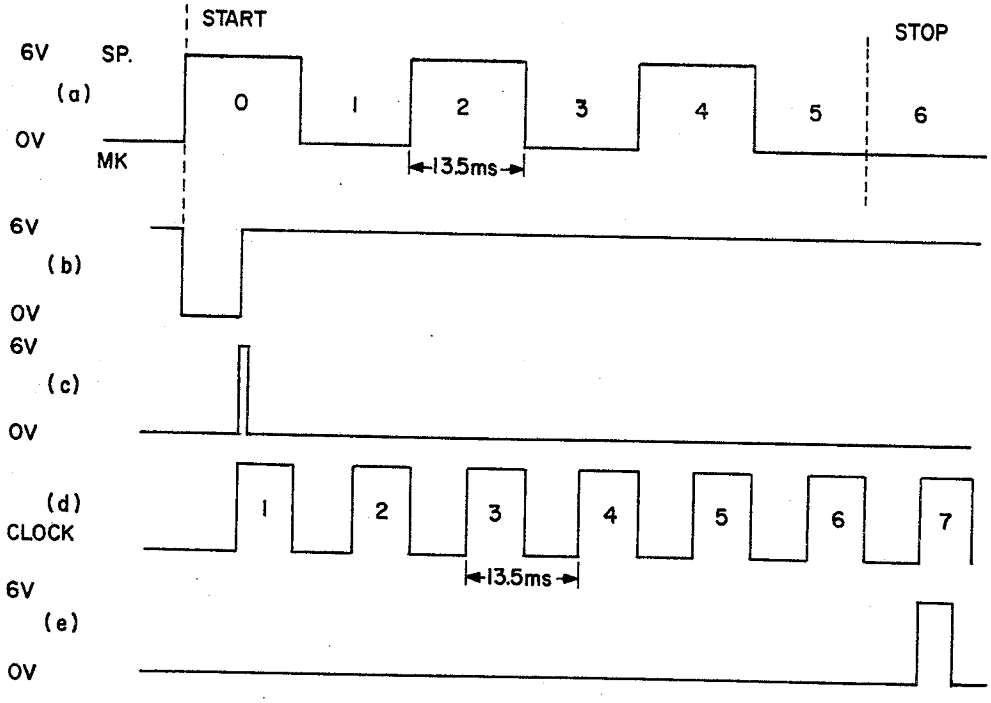
FIG. 4 is a waveform diagram which illustrates the operation of the assembler shown in FIG. 3.

The character assembler is shown in FIG. 3. The data is applied from the flip-flop 40 of the interface unit to the first of two one shot multivibrators 50 and 52. Assuming that the addresss reading device is intended to operate with data transmitted at 100 or 107.1 words per minute, the one shots are selected so as to provide an output pulse from the second one shot about the center of the bit period. Thus, the first one shot may have an output pulse width of 6.6 milliseconds, while the second one shot 52 has an output pulse width of 100 microseconds. The first one shot is triggered by the MK to SP transition which is known by reason of the characteristic of a TTY character to necessarily occur at the beginning of the first character (viz. character 0, shown in waveform *a* of FIG. 4). In other words, this transition triggers the first one shot 50 which generates the 6.6 milliseconds pulse, as shown in waveform *b*. The 100 microsecond pulse is generated by the second one shot 52 at the conclusion of the 6.6 millisecond pulse, as shown in waveform *c*. This 100 microsecond pulse is applied to an AND gate 54, together with the data bits from the character assembler. This prevents the assembler from triggering on noise, since a change of state at the input to the assembler must have a duration greater than 6.6 milliseconds in order for the AND gate 54 to be enabled and transfer the pulse from the second one shot 52 to its output.

A flip-flop 56 receives the AND gate output pulse at its set input terminal. When the flip-flop is set, a free running or astable multivibrator 58 which generates output pulses at a 74.2 Hz. rate is enabled to provide a train of output pulses. (For 107.7 words per minute operation the frequency is set 75 Hz.) These pulses are inverted in an inverter amplifier 60, the output of which is illustrated in waveform *d*. A counter 62 which divides by 7 counts these pulses and provides outputs at each of its several stages indicated as $2^0$ $\overline{2^0}$, $2^1$ $\overline{2^1}$, $2^2$ $\overline{2^2}$ outputs. Thus, the number of pulses counted is represented by the state of the counter outputs. These pulses are decoded by a decoder 64 and also applied to an AND gate 66. The AND gate 66 also receives the input data bits by way of an inverter 68. The AND gate will provide an output when a count of 6 is stored in the counter and two other conditions exist; namely, that the 7th pulse is produced by the clock multivibrator 58 and a level corresponding to the stop bit (bit No. 6) appears on the data line. The simultaneous occurrence of the foregoing is taken as an indication that a full character is received and a character assembly flag pulse, as shown in waveform (*e*), is produced by the gate 66.

The decoder 64 is an array of NAND gates connected so that a pulse appears at lines 1, 2, 3, 4, 5 in sequence controlled by the count contained in the counter and the coincidence of a pulse from the clock multivibrator and a level corresponding to space on the data bit line. Thus a pulse on lines 1, 2, 3, 4 or 5 represents a space bit in a data character, and no pulse represents a mark bit. The five bits of the character are presented at the output of the decoder to the data register 18 (FIG. 1). When the character assembly flag pulse is produced, this data is transferred to the data register as a new character. It has been found that the character assembly synchronization ordinarily occurs within two character intervals so that the address reading device quickly becomes conditioned to read incoming data and perform the search in accordance with its program.

What is claimed is:

1. In a teletypewriter communications system having means for printing messages including transmitted call words indicating the stations to which such messages are addressed, a system for selecting a message for printing which comprises:

(a) means coupled to an input line for receiving a serial stream of teletypewriter bits representing said messages, (b) a data register for storing a number of characters which comprise a call word, (c) means responsive to said reecived bits for successively assembling a group of bits containing a certain number of bits which follow a prescribed initial bit into data characters, entering said character in said data register and providing a flag signal upon assembly of each of said data characters, (d) memory means for storing a plurality of bits representing the characters of said call words, (e) detecting means repeatedly operative upon occurrence of each of said flag signals for comparing the characters of said call words stored in said memory with a sequence of data characters stored in said data register ending with the character received immediately prior to the generation of the flag signal to which said detecting means is responsive for providing an output when the presence of a call word in the stream of input teletypewriter bits received by said receiving means is detected, and (f) means in said receiving means operated by said detecting means output for enabling the passage of said received stream of bits to said receiving means for printing said message.

2. The invention as set forth in claim 1 wherein:

(a) said data register has storage for characters equal in number to the number of characters in said sequence of data characters and for presenting said characters, one at a time, to said comparison means, and including (b) programming means operated upon receipt of each of said flag signals for reading into said register the character received immediately prior to generation of each of said flag signals and operating said comparing means to compare the characters of said call words with said data characters then in said register.

3. The invention as set forth in claim 2 wherein:

(a) said memory means includes an electronic memory having storage for teletypewriter reference characters such as the bits representing space, carriage return and line feed, and wherein (b) said programming means includes means for reading out said characters into said detecting means and deriving outputs for inhibiting said receiving means from providing said stream of bits to said printing means when certain sequences of said reference characters are detected.

4. The invention as set forth in claim 1 wherein said assembling means comprises:

(a) means for generating pulses at a repetition rate equal to the repetition rate of said input data bits, (b) means for counting a number of said pulses equal in number to the bits in each said data character, (c) means for starting said count upon reception of a bit having the characteristics of an initial bit of one of said data character, (d) means for producing said flag signal when said counting means contains said number and a pulse is produced by said generating means upon reception of a bit having the characteristics of the last bit of a data character.

5. The invention as set forth in claim 4 including a decoder coupled to said receiving means for receiving said data bits and coupled to said counting means for presenting each of the bits of a data character on a different output line when said counting means stores a number corresponding thereto.

6. The invention as set forth in claim 4 wherein:

(a) said generating means is an oscillator and said counting means is a counter having outputs which represent the number of pulses from said oscillator stored therein, (b) said means for starting said count includes a circuit for producing a start pulse about one half a bit interval after receipt of transition between a bit level representing a mark and a bit level representing a space, and means operated by said start pulse operatively coupling to said oscillator to said counter for applying pulses thereto, (c) said flag signal generating means includes a gate coupled to said counter outputs, said oscillator and said input data bit line, and wherein (d) means are provided for stopping said oscillator in response to said flag signal.

7. The invention as set forth in claim 6 wherein said means for stopping and starting said oscillator is a flip-flop operated into an oscillator enabling state by said start pulse into an oscillator inhibiting state by said stop pulse.

8. The invention as set forth in claim 7 wherein said start pulse producing circuit includes a pair of one shot multivibrators coupled in tandem, and a gate for producing said start pulse in response to an output pulse from the second of said gates and a space level from said input teletype line.

References Cited

UNITED STATES PATENTS

| | | | |
|---|---|---|---|
| 2,973,507 | 2/1961 | Grondin | 178—2 |
| 3,374,309 | 3/1968 | Elich et al. | 178—3 |

THOMAS A. ROBINSON, Primary Examiner

U.S. Cl. X.R.

340—147